United States Patent
Badger, II

(10) Patent No.: US 10,220,713 B2
(45) Date of Patent: Mar. 5, 2019

(54) ELECTRIC VEHICLE CHARGING STATION

(71) Applicant: Ford Global Technologies, LLC, Dearborn, MI (US)

(72) Inventor: Charles Everett Badger, II, Garden City, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 537 days.

(21) Appl. No.: 14/800,790

(22) Filed: Jul. 16, 2015

(65) Prior Publication Data

US 2017/0015209 A1 Jan. 19, 2017

(51) Int. Cl.
*H02J 7/00* (2006.01)
*H02J 7/04* (2006.01)
*B60L 11/18* (2006.01)
*G06Q 30/06* (2012.01)
*G06Q 50/30* (2012.01)

(52) U.S. Cl.
CPC ....... *B60L 11/1818* (2013.01); *B60L 11/1809* (2013.01); *B60L 11/1825* (2013.01); *B60L 11/1838* (2013.01); *B60L 11/1846* (2013.01); *G06Q 30/06* (2013.01); *G06Q 30/0645* (2013.01); *G06Q 50/30* (2013.01); *B60L 11/1816* (2013.01); *B60L 11/1824* (2013.01)

(58) Field of Classification Search
USPC ................ 320/162, 107, 108, 109, 132, 106
See application file for complete search history.

(56) References Cited

U.S. PATENT DOCUMENTS

| | | |
|---|---|---|
| 5,847,537 A | 12/1998 | Parmley |
| 8,819,550 B2 | 8/2014 | Evans |
| 8,849,496 B2 | 9/2014 | Miyamoto |
| 2010/0072946 A1* | 3/2010 | Sugano ................... B60L 1/003 320/108 |
| 2010/0228405 A1 | 9/2010 | Morgal |
| 2011/0204720 A1* | 8/2011 | Ruiz ................... B60L 11/1816 307/66 |
| 2011/0291616 A1* | 12/2011 | Kim ....................... B60L 3/003 320/109 |
| 2012/0143401 A1 | 6/2012 | Jayadevappa |
| 2012/0206100 A1* | 8/2012 | Brown ................. B60L 3/0069 320/109 |

(Continued)

FOREIGN PATENT DOCUMENTS

WO WO 2013024483 A2 2/2013

*Primary Examiner* — Alexis Pacheco
(74) *Attorney, Agent, or Firm* — Jennifer Stec; Bejin Bieneman PLC

(57) ABSTRACT

An electric vehicle charging system includes a computing device having a processor and a memory storage device. The computing device is programmed to initiate electric charging of an electric vehicle and provide access to a different vehicle while the electric vehicle is charging. An example method that may be executed by the charging station includes detecting a first vehicle at a charging station, initiating electric charging of the first vehicle at the charging station, transmitting a lock signal to a charge cord of the charging station to lock the charge cord to the first vehicle, providing access to a second vehicle while the first vehicle is charging, detecting a return of the second vehicle to the charging station, and transmitting an unlock signal to the charge cord to unlock the charge cord from the first vehicle.

20 Claims, 2 Drawing Sheets

(56) References Cited

U.S. PATENT DOCUMENTS

| | | | |
|---|---|---|---|
| 2013/0021162 A1* | 1/2013 | DeBoer | B60L 11/1824 340/635 |
| 2014/0167695 A1* | 6/2014 | Shimizu | H01R 13/6275 320/109 |
| 2014/0197790 A1* | 7/2014 | Kaneyasu | B60L 11/1824 320/109 |
| 2014/0225559 A1* | 8/2014 | Sugano | B60L 1/003 320/108 |
| 2014/0266004 A1* | 9/2014 | Andrews, Jr. | B60L 11/005 320/104 |
| 2014/0292275 A1* | 10/2014 | Kordowski | B60L 11/1818 320/109 |
| 2015/0061594 A1* | 3/2015 | Hockenstrom | B60L 8/006 320/109 |
| 2015/0151644 A1* | 6/2015 | Nakajima | B60K 1/04 320/109 |
| 2015/0329002 A1* | 11/2015 | Broecker | B60L 11/1838 320/109 |
| 2016/0052411 A1* | 2/2016 | Tanabe | B60L 3/0023 320/109 |
| 2016/0121735 A1* | 5/2016 | Sugano | B60L 11/1818 320/109 |
| 2016/0144728 A1* | 5/2016 | Harper | B60L 11/1803 320/109 |

\* cited by examiner

ELECTRIC VEHICLE CHARGING STATION

BACKGROUND

Electric charging stations will be more prevalent as electric vehicles become more popular, especially in urban areas. Public electric charging stations (that is, electric charging stations that are available for members of the public at large to use) give owners of electric vehicles some assurance that the electric vehicle can be charged while away from the owner's home, allowing electric vehicles to be used for longer, and in some cases, more meaningful trips.

DETAILED DESCRIPTION

Widespread availability of public charging stations does not address density issues that make it difficult for motor vehicles to navigate through urban areas. For that, many municipalities have adopted bicycle (or other small vehicle) sharing programs. A bicycle sharing program allows a person to rent a bicycle for a limited amount of time. Thus, a motor vehicle owner can park his or her motor vehicle near an urban area, rent a bicycle, and use the bicycle to navigate the urban area. For drivers of electric vehicles, finding an electric charging station with a nearby bicycle rental location can be frustrating.

One solution includes an electric vehicle charging system with a computing device having a processor and a memory storage device. The computing device is programmed to initiate electric charging of an electric vehicle and provide access to a different vehicle while the electric vehicle is charging. An example method that may be executed by the charging station includes detecting a first vehicle at a charging station, initiating electric charging of the first vehicle at the charging station, transmitting a lock signal to a charge cord of the charging station to lock the charge cord to the first vehicle, providing access to a second vehicle while the first vehicle is charging, detecting a return of the second vehicle to the charging station, and transmitting an unlock signal to the charge cord to unlock the charge cord from the first vehicle.

Accordingly, the driver of an electric vehicle may park the electric vehicle at such a charging station and elect to use a bicycle or other secondary vehicle to get around the area or beyond. The electric vehicle may be locked to the charging station during charging and until the bicycle or other secondary vehicle has been returned. Thus, until electric charging stations become more abundant, drivers of electric vehicles can use the secondary vehicle to access areas where no electric charging stations are located. Further, municipalities can concentrate electric charging stations to particular areas without inadvertently excluding drivers of electric vehicles from experiencing all areas of the municipality. The elements shown may take many different forms and include multiple and/or alternate components and facilities. The example components illustrated are not intended to be limiting. Indeed, additional or alternative components and/or implementations may be used.

Figure 1:
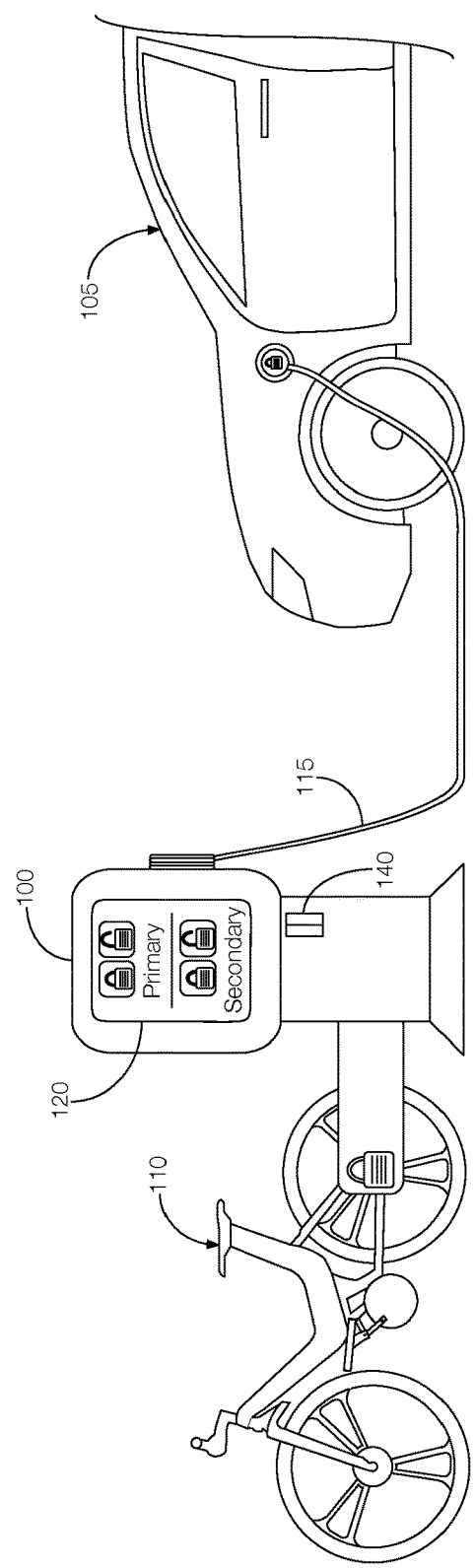
FIG. 1 illustrates an example primary vehicle and charging station with an option to receive a secondary vehicle while the primary vehicle is charging.

As illustrated in FIG. 1, an electric vehicle charging station 100 can initiate charging of an electric vehicle (referred to below as a "primary vehicle 105") as well as provide access to another, typically smaller vehicle (referred to below as a "secondary vehicle 110") such as a bicycle, e-bike, scooter, motorized cart, Segway® personal transport vehicle, or other means of transportation. Although illustrated as a sedan, the primary vehicle 105 may include any partially or fully electrically-powered passenger or commercial automobile such as a car, a truck, a sport utility vehicle, a crossover vehicle, a van, a minivan, a taxi, a bus, etc. In some possible approaches, the primary vehicle 105 is an autonomous vehicle configured to operate in an autonomous (e.g., driverless) mode, a partially autonomous mode, and/or a non-autonomous mode.

The primary vehicle 105 may be plugged into the charging station 100 via a charge cord 115. The charge cord 115 may include an electrically actuated lock that locks the charge cord 115 to the primary vehicle 105. The charging station 100 may control whether the charge cord 115 is locked or unlocked. The charging station 100 may further control whether the driver of the primary vehicle 105 has access to the secondary vehicle 110. If so, the charging station 100 may lock the charge cord 115 to the primary vehicle 105 while the secondary vehicle 110 is released to the driver. The driver may use the secondary vehicle 110 for some period of time. When the secondary vehicle 110 is returned, the charging station 100 may unlock the charge cord 115 to the primary vehicle 105.

The charging station 100 may include a user interface device 120 to, e.g., facilitate interactions with the driver of the primary vehicle 105. The user interface device 120 may be programmed to present information to the driver of the primary vehicle 105. Moreover, the user interface device 120 may be configured to receive user inputs from the driver of the primary vehicle 105. In some possible approaches, the user interface device 120 may include a touch-sensitive display screen and possibly peripheral devices such as a keyboard, real or virtual buttons, a credit card reader 140 or other means of receiving payment, a microphone, a speaker, a camera, a biometric reader, etc. In some instances, the credit card reader may be used to authenticate the driver of the primary vehicle 105. For instance, the charging station 100 may require that a person wishing to unlock the charge cord 115 from the primary vehicle 105 insert a particular credit card, such as a credit card used when the primary vehicle 105 was connected to the charging station 100. This way, the charging station 100 can authenticate the driver of the primary vehicle 105 without inadvertently releasing the primary vehicle 105 to an unauthorized individual.

Figure 2:
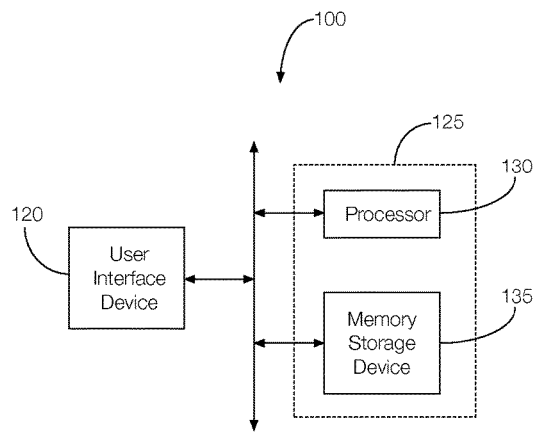
FIG. 2 is a block diagram showing example components of the charging station.

FIG. 2 is a block diagram showing example components of the charging station 100. As illustrated, the charging station 100 includes computing device 125 having a processor 130 and a memory storage device 135. The computing device 125 may include any electronic device that can access computer-readable instructions stored in the memory storage device 135 and process such instructions via, e.g., the processor 130.

The computing device 125 may be programmed to facilitate various features of the charging station 100 discussed above. For instance, the computing device 125 may be programmed to initiate electric charging of the primary vehicle 105 and provide access to the secondary vehicle 110 while the primary vehicle 105 is charging. Moreover, the computing device 125 may be programmed to output various signals to other components of the charging station 100. Examples of such signals may include, e.g., a lock signal to lock the charge cord 115 to the primary vehicle 105, an unlock signal to unlock the charge cord 115 and release the primary vehicle 105, a receipt signal indicating that the secondary vehicle 110 has been returned, a signal permitting the driver of the primary vehicle 105 access to the secondary vehicle 110, and the like.

Any number of these and other signals may be generated in response to a user input received via the user input device. For instance, the computing device 125 may generate the signal permitting access to the secondary vehicle 110 in response to a user input indicating the driver's desire to use the secondary vehicle 110 while the primary vehicle 105 is charging. That is, the computing device 125 may unlock the secondary vehicle 110 in response to the driver providing a user input indicating his or her desire to use the secondary vehicle 110. Unlocking the secondary may include transmitting a signal that unlocks the secondary vehicle 110 from the charging station 100. In another example approach, unlocking the secondary vehicle 110 may include displaying via the user interface device 120 a code that the driver may use to unlock the secondary vehicle 110.

Around the same time the secondary vehicle 110 is unlocked, the computing device 125 may transmit the lock signal to lock the charge cord 115 to the primary vehicle 105. Therefore, the computing device 125 may prompt the driver, via the user interface device 120, to insert the charge cord 115 into the corresponding charge port on the primary vehicle 105. The computing device 125 may confirm that the charge cord 115 has been inserted into the charge port before sending the lock signal and before releasing the secondary vehicle 110 to the driver. The computing device 125 may further confirm whether the charge cord 115 has been inserted and locked prior to releasing the secondary vehicle 110 to the driver. In some possible implementations, the charge cord 115 may include, e.g., a radio frequency identification (RFID) or near field communication (NFC) chip that can be used to detect whether the charge cord 115 has been plugged into the primary vehicle 105. The chip on the charge cord 115 may communicate with a corresponding chip incorporated into the primary vehicle 105. The lock signal may be generated in response to successful communication between the two chips, and a sensor may be used to determine whether the lock has been actuated. The sensor signal confirming that the lock has been actuated may be transmitted back to the computing device 125. The computing device 125 may be programmed to confirm that the lock is engaged upon receipt of the sensor signal. The secondary vehicle 110 may be locked and unlocked to the charging station 100 through a similar approach. For instance, the lock for the secondary vehicle 110 may include an RFID or NFC chip to detect the presence of the secondary vehicle 110, and the lock may engage, locking the secondary vehicle 110 to the charging station 100, based on communication between the secondary vehicle 110 and the charging station 100, indicating the presence of the secondary vehicle 110 at the charging station 100 and ready to be locked.

When the secondary vehicle 110 is returned to the charging station 100 and locked, the computing device 125 may prompt the driver for another user input such as, e.g., the driver's credentials, payment information, etc., via the user interface device 120. Thus, after the driver has been authenticated, and use of the secondary vehicle 110, electricity for charging the primary vehicle 105, and use of the parking space paid for, the computing device 125 may send the unlock signal to unlock the charge cord 115. When unlocked, the charge cord 115 may be removed from the charge port of the primary vehicle 105. The driver may be authenticated by the driver providing a user name, password, or both, to the charging station 100 via the user interface device 120. The computing device 125 may compare the provided credentials to a database stored in the memory storage device 135 or stored on a cloud-based server and transmit the unlock signal if the provided credentials match those in the database. Alternatively or in addition, as discussed above, the computing device 125 may authenticate the driver by, e.g., requesting the driver insert a credit card prior to receiving access to the secondary vehicle 110 and again when attempting to retrieve the primary vehicle 105. Other credentials besides a credit card may be used to authenticate the driver. The authentication may occur locally at the charging station 100 or remotely by, e.g., querying a database stored on a cloud-based server. Once authenticated, the computing device 125 may send the unlock signal so the driver may remove the charge cord 115 from the charge port of the primary vehicle 105.

Figure 3:
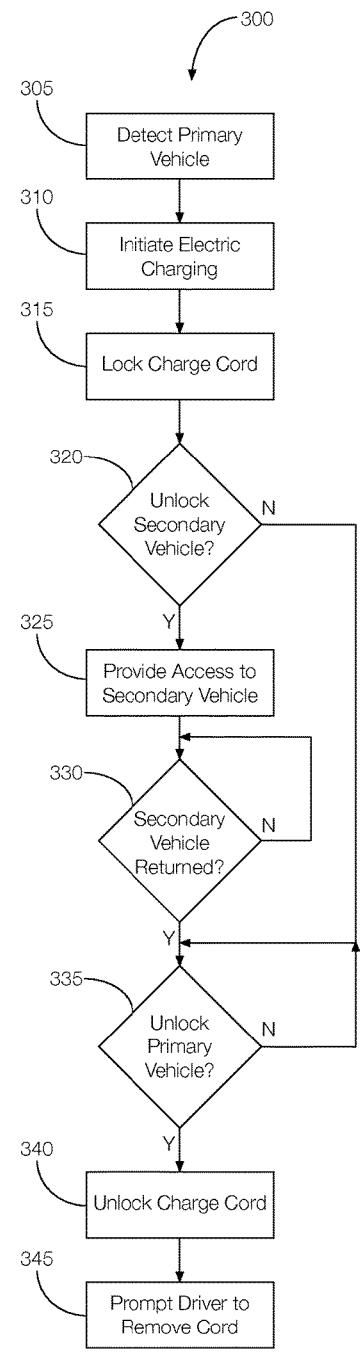
FIG. 3 is a flowchart of an example process that may be executed by the charging station to charge the primary vehicle and provide access to the secondary vehicle while the primary vehicle is charging.

FIG. 3 is a flowchart of an example process 300 that may be executed by the charging station 100 to charge the primary vehicle 105 and provide access to the secondary vehicle 110 while the primary vehicle 105 is charging.

At block 305, the charging station 100 may detect the primary vehicle 105 at the charging station 100. The primary vehicle 105 may be detected via a sensor incorporated into the charging station 100, including the user interface device 120. The sensor may include a vision sensor such as a camera or a proximity sensor. Alternatively, the presence of the primary vehicle 105 may be detected in response to a user input provided to the user interface device 120. Examples of such a user input may include a driver of the primary vehicle 105 pressing a real or virtual button on the user interface device 120.

At block 310, the charging station 100 may initiate electric charging of the primary vehicle 105. For instance, the computing device 125 may prompt the driver, via the user interface device 120, to insert the charge cord 115 into the corresponding charge port of the primary vehicle 105. Upon insertion of the charge cord 115, electricity may flow to the primary vehicle 105 to charge a power storage device such a battery used to power the primary vehicle 105.

At block 315, the charging station 100 may lock the charge cord 115 to the primary vehicle 105. In one possible approach, locking the charge cord 115 may include the computing device 125 generating and transmitting a lock signal that actuates, e.g., a solenoid or other electrically actuated lock that locks the charge cord 115 to the primary vehicle 105. When locked, the charge cord 115 cannot be removed from the primary vehicle 105. In some instances, electricity may flow to the primary vehicle 105 only when the charge cord 115 is locked.

At decision block 320, the charging station 100 may prompt the driver to select whether to unlock the secondary vehicle 110. The computing device 125 may generate the prompt, which may be presented to the driver via the user interface device 120. The driver's response may be received via the user interface device 120 as a user input. If the user input indicates that the driver desires to use the secondary vehicle 110, the process 300 may proceed to block 325. If the user input indicates that the driver does not desire to use the secondary vehicle 110, the process 300 may proceed to block 335.

At block 325, the charging station 100 may, in response to receiving the user input at block 320, provide access to the secondary vehicle 110. Providing access to the secondary vehicle 110 may include unlocking the secondary vehicle 110 or displaying a code or other instructions for manually unlocking the secondary vehicle 110. Thus, the driver may have access to the secondary vehicle 110 while the primary vehicle 105 is charging.

At decision block 330, the charging station 100 may determine whether the secondary vehicle 110 has been returned. The computing device 125 may determine whether the secondary vehicle 110 has been returned based on, e.g., the receipt of the receipt signal. The receipt signal may be generated by a sensor that is configured or programmed to detect whether the secondary vehicle 110 is nearby and locked to the charging station 100 or another designated return area. If the receipt signal is received from the sensor, the process 300 may proceed to block 335. Otherwise, the process 300 may repeat block 330 until the secondary vehicle 110 is returned.

At block 335, the charging station 100 may determine whether to unlock the primary vehicle 105 from the charge cord 115. In one possible approach, the computing device 125 may generate the unlock signal in response to a user input authenticating the user, paying for the use of the electricity to charge the primary vehicle 105, paying for the use of the parking space, or the like. In addition, if the secondary vehicle 110 was used, the computing device 125 may generate the unlock signal only if the receipt signal has been received indicating that the secondary vehicle 110 has been returned. If these criteria have been met, the process 300 may proceed to block 340. Otherwise, the process 300 may continue to execute block 335 until the criteria for unlocking the charge cord 115 from the primary vehicle 105 have been met.

At block 340, the charging station 100 may transmit the unlock signal. The unlock signal may be generated by the computing device 125 and transmitted to the electrically actuated lock, which may unlock in response to receiving the unlock signal.

At block 345, the charging station 100 may prompt the driver to remove the charge cord 115 from the primary vehicle 105. The prompt may be generated by the computing device 125 and presented to the driver via the user interface device 120.

The process 300 may end after block 345.

Accordingly, with the charging station 100 and process 300 described, the driver of an electric vehicle may park the electric vehicle and use a bicycle or other secondary vehicle 110 to travel congested areas while the electric vehicle is being charged. This gives the driver greater access to areas where no electric charging stations 100 are located. Further, it allows municipalities to concentrate electric charging stations 100 to particular areas without inadvertently excluding drivers of electric vehicles from experiencing other areas of the municipality.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An electric vehicle charging system comprising:
a computing device having a processor and a memory storage device, wherein the computing device is programmed to initiate electric charging of a first vehicle while the first vehicle is locked to a charging station and provide access to a second vehicle locked to the charging station while the first vehicle is charging,
wherein providing access to the second vehicle includes the computing device sending a signal to the charging station commanding the charging station to unlock the second vehicle from the charging station while the first vehicle is locked to the charging station.

2. The electric vehicle charging system of claim 1, wherein the computing device is programmed to output a lock signal to lock a charge cord of the charging station to the first vehicle prior to sending the signal to unlock the second vehicle from the charging station.

3. The electric vehicle charging system of claim 2, wherein the computing device is programmed to output an unlock signal to unlock the charge cord.

4. The electric vehicle charging system of claim 3, wherein the computing device is programmed to receive a receipt signal representing a return of the second vehicle to the charging system.

5. The electric vehicle charging system of claim 4, wherein the computing device is programmed to generate the unlock signal in response to receiving the receipt signal.

6. The electric vehicle charging system of claim 1, further comprising a user interface device programmed to receive a user input and transmit the user input to the computing device.

7. The electric vehicle charging system of claim 6, wherein the computing device is programmed to generate a lock signal to lock a charge cord to the first vehicle in response to the user input.

8. The electric vehicle charging system of claim 6, wherein the computing device is programmed to generate an unlock signal to unlock a charge cord in response to the user input.

9. An electric vehicle charging station comprising:
a user interface device programmed to receive a user input;
a charge cord configured to lock to a first vehicle to lock the first vehicle to the charging station; and
a computing device having a processor and a memory storage device, wherein the computing device is programmed to initiate electric charging of the first vehicle while the first vehicle is locked to the charge cord and provide access to a second vehicle locked to the charging station while the first vehicle is charging,
wherein providing access to the second vehicle includes the computing device sending a signal commanding the charging station to unlock the second vehicle from the charging station while the first vehicle is locked to the charge cord.

10. The electric vehicle charging station of claim 9, wherein the computing device is programmed to output a lock signal to lock the charge cord to the first vehicle prior to sending the signal to unlock the second vehicle from the charging station.

11. The electric vehicle charging station of claim 9, wherein the computing device is programmed to output an unlock signal to unlock the charge cord.

12. The electric vehicle charging station of claim 9, wherein the computing device is programmed to receive a receipt signal representing a return of the second vehicle to the charging station.

13. The electric vehicle charging station of claim 12, wherein the computing device is programmed to generate the unlock signal in response to receiving the receipt signal.

14. The electric vehicle charging station of claim 9, wherein the user interface device is programmed to transmit the user input to the computing device.

15. The electric vehicle charging station of claim 9, wherein the computing device is programmed to generate a lock signal to lock the charge cord to the first vehicle in response to receiving the user input.

16. The electric vehicle charging station of claim 9, wherein the computing device is programmed to generate an unlock signal to unlock the charge cord in response to receiving the user input.

17. A method comprising:
detecting a first vehicle at a charging station;

initiating electric charging of the first vehicle at the charging station;

transmitting a lock signal to a charge cord of the charging station to lock the charge cord to the first vehicle prior to providing access to a second vehicle locked to the charging station;

providing access to the second vehicle while the first vehicle is charging, wherein providing access to the second vehicle includes sending a signal to the charging station commanding the charging station to unlock the second vehicle from the charging station while the first vehicle is locked to the charge cord;

detecting a return of the second vehicle to the charging station; and transmitting an unlock signal to the charge cord to unlock the charge cord from the first vehicle.

18. The method of claim 17, wherein detecting the return of the second vehicle includes receiving a receipt signal representing the return of the second vehicle to the charging system and wherein the unlock signal is transmitted in response to receiving the receipt signal.

19. The method of claim 17, further comprising:

receiving a first user input, wherein access to the second vehicle is provided in response to receiving the user input; and receiving a second user input, wherein the unlock signal is transmitted in response to receiving the second user input.

20. The electric vehicle charging station of claim 9, wherein the first vehicle is an automobile and wherein the second vehicle is a bicycle.

* * * * *